March 16, 1954   N. C. BERGERON   2,672,184
LEVER ACTUATED TIRE BEAD FORCING DEVICE
Filed March 1, 1952   2 Sheets-Sheet 1
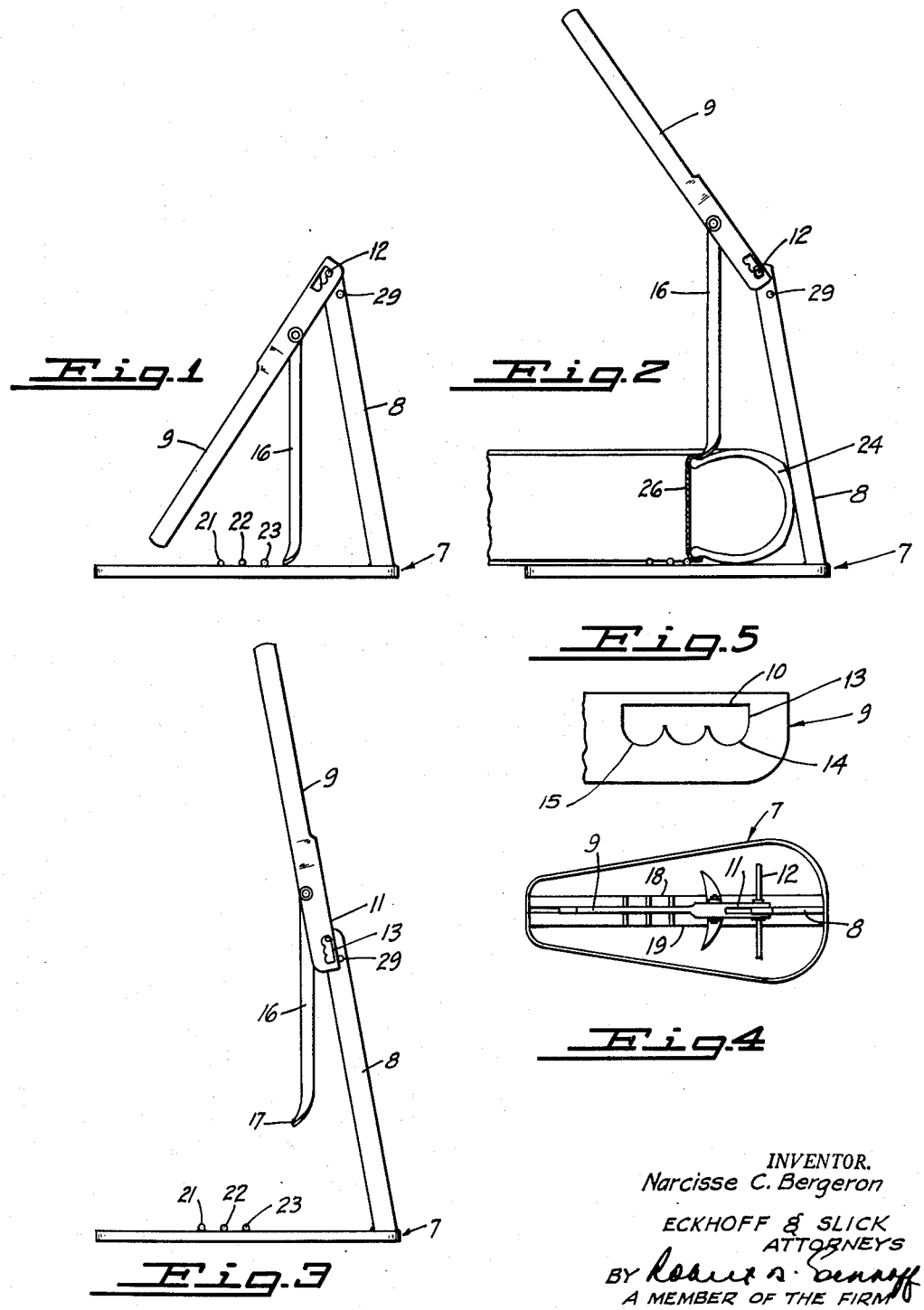
INVENTOR.
Narcisse C. Bergeron
ECKHOFF & SLICK
ATTORNEYS
BY
A MEMBER OF THE FIRM

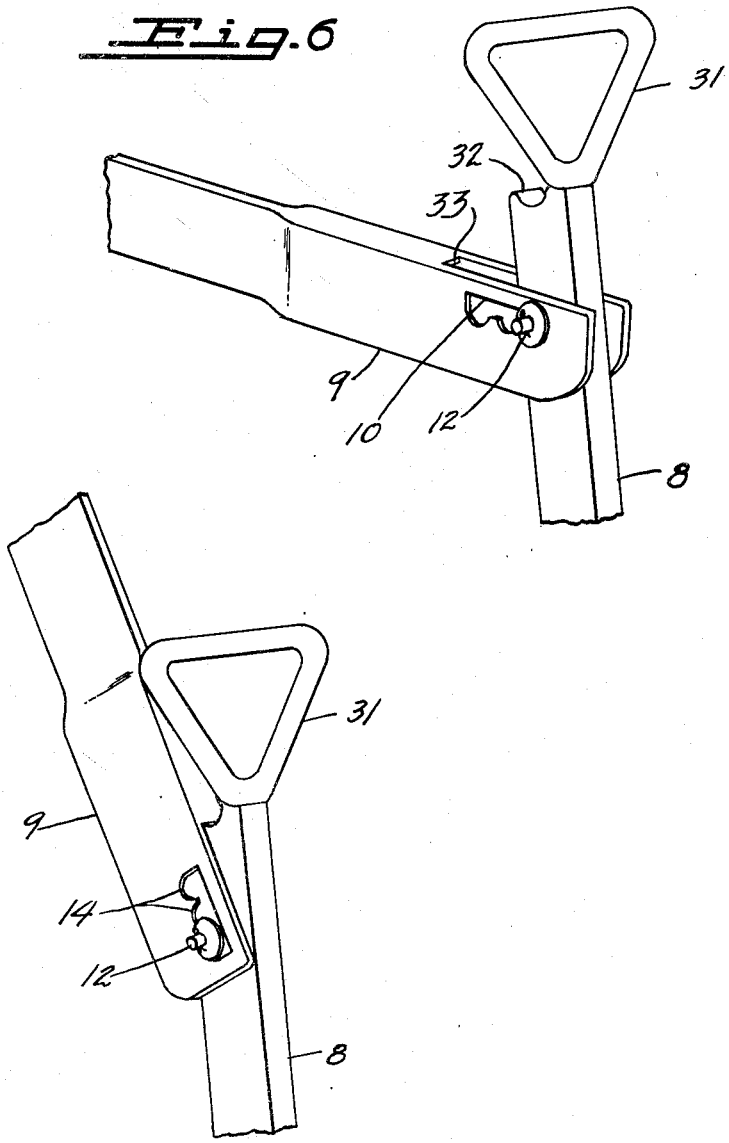

Patented Mar. 16, 1954

2,672,184

UNITED STATES PATENT OFFICE 2,672,184

LEVER ACTUATED TIRE BEAD FORCING DEVICE

Narcisse C. Bergeron, Berkeley, Calif.

Application March 1, 1952, Serial No. 274,419

1 Claim. (Cl. 157—1.26)

This invention relates to the construction of a tool for removing a tire from a rim and particularly to one adapted to assist in releasing the bead of a tire from engagement with a wheel rim.

It is in general the broad object of the present invention to provide a lever actuated tire bead forcing device which can be utilized with various sizes of tires.

A further object of the present invention is to provide a tire tool in which the parts are so designed that they may be readily moved to and from a position of rest to engage a tire bead without requiring the operator to manipulate catches or other fastening devices and with a minimum of movement of the manipulated parts.

The invention includes other objects and features of advantage, some of which, together with the foregoing, will appear in the following description of the preferred form of the invention which is illustrated in the drawing accompanying and forming a part of the specification. Referring to the drawing, Figure 1 is a side view of the device showing the device in one at rest position.

Figure 2 is a view similar to 1, showing the device in use.

Figure 3 is a side view showing the device in another at rest position.

Figure 4 is a plan view of the device shown in Figure 1.

Figure 5 is an enlarged fragmentary view of the end of the manipulating handle.

Figures 6 and 7 are perspective views illustrating a modified form of the device.

Referring to the drawing, the device includes a base or standard 7 made in arcuate form from a piece of strap metal and of such size as to provide adequate stability for the device during its manipulation. At one end of the base 7 is provided a standard 8, the latter extending upwardly at an angle to the vertical so that the standard extends along the run of the base. A lever 9, bifurcated as at 11, is mounted by pin 12 for hinged movement upon the standard 8; pin 12 is of a length to permit it to be used as a handle. In accordance with this invention, the bifurcated end of lever 9 is slotted as at 13, one side, 10, defining slot 13 extending parallel to the axis of the handle while opposite side 15 is formed with a plurality of semi-circular indentations 14 to receive the underside of pin 12 and so permit lever 9 to be moved axially to various selected positions of adjustment with respect to the standard 8.

Mounted on the underside of the bifurcated end 11 of lever 9 is a depending arm 16 having an arcuate bead engaging member 17 of a form well-known in the art and adapted to engage a tire bead, as will be presently described.

The standard 7 includes two spaced members 18 and 19 extending from one end of the base to the other. In accordance with this invention, transverse rim engaging members 21, 22 and 23 are mounted at spaced distances from standard 8, each distance corresponding to the overall dimension from the inside of a rim to the outside of a given size of tire.

In use, a tire, indicated at 24 and mounted upon a rim generally indicated at 26, is placed on the standard 7 with the tire in abutment against the standard 8, as is shown in Figure 2. In this position, the rim 26 engages one of the transverse members 21, 22, or 23, depending upon the overall dimension of the tire and rim, such engagement retaining the tire and rim with adequate security. Lever 9 is then drawn down to engage the bead engaging member 17 with the bead, the lever being moved in relation to pin 11 to engage the pin with that one of the semicircular indentations 14, which will enable the arm 16 to move down vertically and thus position the arm with the shortest possible distance from the fulcrum provided by the pin 11. Pressure is then applied to the bead to break the engagement of the bead with the rim.

When it is desired to position lever 9 out of the way so that a tire may be moved about or positioned on base 7, lever 9 is first raised into a position in which it provides an axial continuation of standard 8; the lever is then moved downwardly until pin 12 rests at an end of slot 13 and the bifurcated end of lever 9 engages a pin 29, which extends through the standard. In this position, the lever can be readily moved into operating position with a minimum of effort while the bead engaging member 17 is positioned for quick and ready engagement with the bead.

In the modification shown in Figures 6 and 7, standard 8 has been provided with a loop handle 31 which enables the device to be moved around readily; the handle also acts as a barrier to prevent lever 9 from swinging over to the other side of standard 8. In this modification, pin 12 is positioned in a suitable spaced relation to the end of the standard 8 and a notch 32 is provided in the end of standard 8 and is adapted to be engaged with the transverse portion 33 of the bifurcated end 11 of lever 9; when the handle is so engaged with the notch 32, it stands in an upright position and the depending arm 16 is elevated to permit the ready positioning of a tire.

From the foregoing, I believe it will be apparent that I have provided a relatively novel, simple and improved lever actuated tire bead forcing device which can be manipulated readily, is conveniently positioned, and is adaptable for use with various sizes of tires.

I claim:

A tire tool comprising a base, a standard extending upwardly and forwardly from said base, a pin extending through the upper end of the standard, a lever having a slot therein engaged with said pin to mount the lever in any one of a plurality of selected positions with respect to said pin, an arm freely hinged on said lever intermediate the ends thereof and adjacent to said pin, means on the standard engageable by an edge of the lever which enables the lever to be held in an inactive position wherein it extends substantially in axial alignment with the standard and wherein said arm depends vertically from the lever, a tire bead engaging element mounted upon the end of said depending arm, and at least one rim-engaging member mounted on said base parallel to said element and in a spaced relation to said standard to engage and retain temporarily a rim on a tire positioned for manipulation by said tire bead engaging element.

NARCISSE C. BERGERON.

References Cited in the file of this patent

UNITED STATES PATENTS

| Number    | Name        | Date          |
|-----------|-------------|---------------|
| 1,217,777 | Kinsolving  | Feb. 27, 1917 |
| 1,742,590 | Freivogel   | Jan. 7, 1930  |
| 2,217,139 | Smith       | Oct. 8, 1940  |
| 2,433,113 | Graves et al. | Dec. 23, 1947 |
| 2,527,102 | Miess       | Oct. 24, 1950 |
| 2,598,793 | Helton      | June 3, 1952  |